United States Patent
Fabri et al.

(10) Patent No.: US 10,687,534 B2
(45) Date of Patent: Jun. 23, 2020

(54) METHOD TO CONTROL ADULT INSECT POPULATION

(71) Applicant: UPL LTD, Haldia (IN)

(72) Inventors: Carlos Eduardo Fabri, São Paulo (BR); Marcelo Amaral Neves Araújo Pessanha, São Paulo (BR); Jaidev Rajnikant Shroff, Dubai (AE); Vikram Rajnikant Shroff, Dubai (AE)

(73) Assignee: UPL LTD., Haldia (IN)

( * ) Notice: Subject to any disclaimer, the term of this patent is extended or adjusted under 35 U.S.C. 154(b) by 0 days.

(21) Appl. No.: 16/477,312

(22) PCT Filed: Dec. 27, 2017

(86) PCT No.: PCT/IB2017/058408
§ 371 (c)(1),
(2) Date: Jul. 11, 2019

(87) PCT Pub. No.: WO2018/130900
PCT Pub. Date: Jul. 19, 2018

(65) Prior Publication Data
US 2020/0029569 A1  Jan. 30, 2020

(30) Foreign Application Priority Data
Jan. 11, 2017  (IN) .............................. 201731001199

(51) Int. Cl.
*A01N 53/00* (2006.01)
*A01N 47/40* (2006.01)
*A01N 25/12* (2006.01)

(52) U.S. Cl.
CPC ............. *A01N 53/00* (2013.01); *A01N 47/40* (2013.01); *A01N 25/12* (2013.01)

(58) Field of Classification Search
None
See application file for complete search history.

(56) References Cited

U.S. PATENT DOCUMENTS

| | | | |
|---|---|---|---|
| 7,901,700 B2 * | 3/2011 | Richman ................ | A01N 53/00 424/405 |
| 10,172,348 B2 * | 1/2019 | Talati ..................... | A01N 47/40 |
| 2008/0319029 A1 | 12/2008 | Richman et al. | |
| 2018/0000072 A1 | 1/2018 | Talati et al. | |

FOREIGN PATENT DOCUMENTS

| | | |
|---|---|---|
| CN | 102986718 | 3/2013 |
| JP | 2008133240 | 6/2018 |
| WO | 2004064517 | 8/2004 |

OTHER PUBLICATIONS

Natwick, Proceedings of the Beltwide Cotton Conference (1999), vol. 2, pp. 919-921.*
Liu et al., CAS SciFinder abstract (database CAPLUS 1995:675749) of Journal of Economic Entomology (1995), 88(3), pp. 564-568.*
Liu et al., Journal of Economic Entomology (1995), 88(3), pp. 564-568.*
International Search Report for International Application No. PCT/IB2017/058408 filed Dec. 27, 2017; dated Mar. 29, 2018; 6 pages.
Written Opinon of the International Searching Authority for International Application No. PCT/IB2017/058408 filed Dec. 27, 2017; dated Mar. 29, 2018; 7 pages.
Castro et al.; "Arthropod Management: Comparative Efficacy of Selected Insecticide Alternatives for Boll Weevil (Coleoptera: Curculionidae) Control Using Laboratory Bioassays" Journal of Cotton Science, vol. 13, Issue No. 3; 2009; pp. 189-195.
FMC Corporation; "Transport(TM) GHP Insecticide Material Safety Data Sheet"; Retrieved from URL: http://www.franklinpestsolutions.com/filebin/safetydatasheet/transportghp_sds.pdf; 2017; 8 pages.
FMC Corporation; "Transport(TM) Mikron Insecitcide Material Safety Data Sheet"; Retrieved from URL: https://www.uky.edu/housing/sites/www.uky.edu.housing/files/Transport_Mikron_SDS_6-2015.pdf; 2015; 9 pages.
Leonard, et al.; "Toxicity of pyrethroids tested against boll weevil (Coleoptera: Curculionidae) adults in laboratory and field trials"; Journal of Agricultural Entomology, vol. 6, Issue No. 4; 1989; pp. 265-274.
Palumbo, J.C.; "Evaluation of neonicotinoid and pyrethroid mixtures for control of sweetpotato whitefly adults on broccoli, 2011"; Arthropod Management Tests, vol. 37, Issue No. 1; 2012; p. 1.
Yang; "Study on the mixture of acetamiprid and bifenthrin controlling Empoasca vitis"; Master's Thesis at Fujian Agriculture and Forestry University; 2010: 61 pages.

* cited by examiner

*Primary Examiner* — Brian J Davis
(74) *Attorney, Agent, or Firm* — Cantor Colburn LLP

(57) ABSTRACT

A method of predominantly controlling adult insect infestation at a locus and a composition therefor.

8 Claims, No Drawings

METHOD TO CONTROL ADULT INSECT POPULATION

CROSS REFERENCE TO RELATED APPLICATIONS

This application is a National Stage application of PCT/IB2017/058408, filed Dec. 27, 2017, which claims the benefit of Application No. IN 201731001199, filed Jan. 11, 2017, both of which are incorporated by reference in their entirety herein.

FIELD OF THE INVENTION

The present invention relates to methods of controlling insect pests. More particularly, the present invention relates to methods of controlling predominantly adult pests in crops and compositions therefor.

BACKGROUND AND PRIOR ART

Methods of controlling or eradicating insect pests are desirable in many instances, more so when the crops are of commercial interest. Insects are very destructive to the crop and can cause significant damage and loss of yield. Many insecticidal agents and compositions are commercially available for these purposes.

Combination of insecticides are used to broaden the spectrum of control, reduce dosage, thereby reducing environmental impact, decrease chances of development of resistance. The combination of insecticides at times demonstrate an additive or synergistic effect that results in an improved control on the pests.

However, most combinations are not known to control both adults and pre-adults. These pre-adults may include larva or nymphs and the like. Pre-adults are voracious eaters and along with the adults consume large parts of leaves as well as other parts of the plant. Adult insects propagate, leading to a surge in population of the pre-adults which further compounds the problem. There is therefore a need in the art for methods of controlling the adult insects, thereby preventing them from propagation. The present methods used to control pre-adults include use of insect growth regulators. These growth regulators are typically used in higher amounts and are rarely effective on adults. There is therefore a need in the art for an effective method to control adult insects which in turn will result in the control of the larva, specifically in the early stages where the adults have just started breeding.

The combination of acetamiprid and bifenthrin is known in the art for control of house hold pests. WO2005070209 teaches compositions of the combination for control of general house hold pests. WO2004064517 teaches compositions of the combination for control of termites.

The article Study on the mixture of acetamiprid and bifenthrin controlling *Empoasca vitis*, Yang Zuo, master's thesis 2010 at Fujian Agriculture and Forestry University, found that the five different kinds of mixtures of acetamiprid and bifenthrin had different synergistic effects. This combination, at a ratio of 1:2, was found to have a greater efficacy on nymphs in comparison to the efficacy seen on adults. Another conclusion reached by this author was that this combination was found to be synergistic when administered in a ratio of acetamiprid:bifenthin:2:1. However, a need remains in the art to predominantly control the adult insect infestation at a locus, which is an unfulfilled need in the art.

OBJECTS OF THE INVENTION

One object of the present invention is to provide a method and a composition for controlling insect pests wherein predominantly the adult pests are controlled.

Another object of the present invention is to provide a method and a composition for controlling insect pests that completely eliminates the adult pests thereby complexly stopping the larva from forming.

Yet another object of the present invention is to provide a method and a composition for controlling insect pests that prevents overwinter hibernating adult pests from further infestations.

Embodiment of the present invention can ameliorate one or more of the above mentioned problems.

SUMMARY OF THE INVENTION

Therefore an aspect of the present invention can provide a method of predominantly controlling adult insect pests infestation at a locus, the method comprising applying to the locus a combination comprising acetamiprid and bifenthrin.

Another aspect of the present invention can provide a method of improving yield in crops, the method comprising predominantly controlling adult insect pests infestation at a locus by applying to the locus a combination comprising acetamiprid and bifenthrin.

Yet another aspect of the present invention can provide a method of improving plant health, the method comprising predominantly controlling adult insect pests infestation at a locus by applying to the locus a combination comprising acetamiprid and bifenthrin.

Another aspect of the present invention can provide a composition for predominantly controlling adult insect pests infestation at a locus, the composition comprising a combination comprising acetamiprid and bifenthrin.

In another aspect, the present invention can provide a method of predominantly controlling adult boll weevil infestation at a locus, said method comprising administering to the locus a combination comprising acetamiprid and bifenthrin.

In yet another aspect, the present invention can provide a composition for predominantly controlling adult boll weevil infestation at a locus, the composition comprising a combination comprising acetamiprid and bifenthrin.

DETAILED DESCRIPTION OF THE INVENTION

The term "locus" as used herein refers to a place to which a combination according to the invention is applied. It includes application to an individual plant, a group of plants such as a plant and/or its surrounding, and the region in which plants may be planted as well application directly to an insect or insects and/or the vicinity in which they are located. The term "insects" includes all organisms in the class "Insecta." "Pre-adult" insects refers to any form of an organism prior to the adult stage, including, for example, eggs, larvae, and nymphs. "Insecticidal" refers to the ability of a substance to increase mortality or inhibit growth rate of insects. The term 'plants' refers to all physical parts of a plant, including seeds, seedlings, saplings, roots, tubers, stems, stalks, foliage and fruits. The term "agriculturally acceptable amount of active" refers to an amount of an active that kills or inhibits the plant disease for which control is desired, in an amount not significantly toxic to the plant being treated. To "control" or "controlling" insects means to inhibit, through a toxic effect, the ability of insect pests to survive, grow, feed, and/or reproduce, or to limit insect-related damage or loss in crop plants. To "control" insects may or may not mean killing the insects, although it preferably means killing the insects. The term "substantially controls" or "predominantly controls" the adult infestation includes control of the adult insects exceeding the control of pre-adults by at least about 5%, preferably at least about 10%, more preferably at least about 20%, and most preferably by at least about 50%.

It has surprisingly been found that the combination of acetamiprid and bifenthrin controls adult insect pests substantially more than the pre-adults, thereby controlling population growth and in turn controlling the pest infestation, improving yield and overall plant health. It has further been found that the combination of acetamiprid and bifenthrin, when combined in a ratio of about 1:1, predominantly controls the adult boll weevil infestation at a locus.

Acetamiprid is a neonicotinoid insecticide which acts on the nervous system of the pests. Its chemical name is (E)-N1-[(6-chloro-3-pyridyl)methyl]-N2-cyano-N1-methyl-acetamidine. Bifenthrin is a pyrethroid insecticide which acts on contact with the pests, its chemical name is 2-methyl-3-phenylbenzyl (1RS)-cis-3-(2-chloro-3,3,3-trifluoroprop-1-enyl)-2,2-dimethylcyclopropanecarboxylate.

Without wishing to be bound by theory, the present inventors believe that the combination surprisingly results in substantially higher mortality rate of adults than pre-adults. The control of adults at stages before breeding starts would effectively control adults and prevent pre-adults from forming. The advantage over conventional methods being that pre-adults of certain species of pests such as silver leaf whitefly and the boll weevil hide inside the boll or crevices which are more difficult to reach and completely eradicate using conventional insecticides. The control of adults before breeding effectively eliminates this problem and thus surprisingly reduces the overall insect pest population to an unexpectedly greater degree that could be expected from a conventional insecticide that controls both adults and pre-adults to an equal degree.

Therefore an aspect of the present invention can provide a method of predominantly controlling adult insect pests infestation at a locus, the method comprising applying to the locus a combination comprising acetamiprid and bifenthrin.

In an embodiment, the insect pest may be from Lepidopteran, Coleopteran, Hemipteran, or Homopteran species.

In an embodiment, Lepidopteran pest species which negatively impact agriculture include, but are not limited to, *Achoea janata, Adoxophyes* spp., *Adoxophyes orana, Agrotis* spp. (cutworms), *Agrotis ipsilon* (black cutworm), *Alabama argillacea* (cotton leafworm), *Amorbia cuneana, Amyelosis transitella* (navel orangeworm), *Anacamptodes defectaria, Anarsia lineatella* (peach twig borer), Anomis sabulifera (jute looper), *Anticarsia gemmatalis* (velvetbean caterpillar), *Archips argyrospila* (fruittree leafroller), *Archips rosana* (rose leaf roller), *Argyrotaenia* spp. (tortricid moths), *Argyrotaenia citrana* (orange *tortrix*), *Autographa gamma, Bonagota cranaodes, Borbo cinnara* (rice leaf folder), *Bucculatrix thurberiella* (cotton leafperforator), *Caloptilia* spp. (leaf miners), *Capua reticulana, Carposina niponensis* (peach fruit moth), *Chilo* spp., *Chlumetia transversa* (mango shoot borer), *Choristoneura rosaceana* (obliquebanded leafroller), *Chrysodeixis* spp., *Cnaphalocerus medinalis* (grass leafroller), *Colias* spp., *Conpomorpha cramerella, Cossus cossus* (carpenter moth), *Crambus* spp. (Sod webworms), *Cydia funebrana* (plum fruit moth), *Cydia molesta* (oriental fruit moth), *Cydia nignicana* (pea moth), *Cydia pomonella* (codling moth), *Darna diducta, Diaphania* spp. (stem borers), *Diatraea* spp. (stalk borers), *Diatraea saccharalis* (sugarcane borer), *Diatraea graniosella* (southwester corn borer), *Earias* spp. (bollworms), *Earias insulata* (Egyptian bollworm), *Earias vitella* (rough northern bollworm), *Ecdytopopha aurantianum, Elasmopalpus lignosellus* (lesser cornstalk borer), *Epiphysias postruttana* (light brown apple moth), *Ephestia* spp. (flour moths), *Ephestia cautella* (almond moth), *Ephestia elutella* (tobbaco moth), *Ephestia kuehniella* (Mediterranean flour moth), *Epimeces* spp., *Epinotia aporema, Erionota thrax* (banana skipper), *Eupoecilia ambiguella* (grape berry moth), *Euxoa auxiliaris* (army cutworm), *Feltia* spp. (cutworms), *Gortyna* spp. (stemborers), *Grapholita molesta* (oriental fruit moth), *Hedylepta indicata* (bean leaf webber), *Helicoverpa* spp. (noctuid moths), *Helicoverpa armigera* (cotton bollworm), *Helicoverpa zea* (bollworm/corn earworm), *Heliothis* spp. (noctuid moths), *Heliothis virescens* (tobacco budworm), *Hellula undalis* (cabbage webworm), *Indarbela* spp. (root borers), *Keiferia lycopersicella* (tomato pinworm), *Leucinodes orbonalis* (eggplant fruit borer), *Leucoptera malifoliella, Lithocollectis* spp., *Lobesia botrana* (grape fruit moth), *Loxagrotis* spp. (noctuid moths), *Loxagrotis albicosta* (western bean cutworm), *Lymantria dispar* (gypsy moth), *Lyonetia clerkella* (apple leaf miner), Mahasena corbetti (oil palm bagworm), *Malacosoma* spp. (tent caterpillars), *Mamestra brassicae* (cabbage armyworm), *Maruca testulalis* (bean pod borer), *Metisa plana* (bagworm), *Mythimna unipuncta* (true armyworm), *Neoleucinodes elegantalis* (small tomato borer), *Nymphula depunctalis* (rice caseworm), *Operophthera brumata* (winter moth), *Ostrinia nubilalis* (European corn borer), *Oxydia vesulia, Pandemis cerasana* (common currant *tortrix*), *Pandemis heparana* (brown apple *tortrix*), *Papilio demodocus, Pectinophora gossypiella* (pink bollworm), *Peridroma* spp. (cutworms), *Peridroma saucia* (variegated cutworm), *Perileucoptera coffeella* (white coffee leafminer), *Phthorimaea operculella* (potato tuber moth), *Phyllocnisitis citrella, Phyllonorycter* spp. (leafminers), *Pieris rapae* (imported cabageworm), *Plathypena scabra*, Plodia interpunctella (Indian meal moth), *Plutella xylostella* (diamondback moth), *Polychrosis viteana* (grape berry moth), *Prays endocarpa, Prays oleae* (olive moth), *Pseudaletia* spp. (noctuid moths), *Pseudaletia unipunctata* (armyworm), *Pseudoplusia includens* (soybean looper), *Rachiplusia nu, Scirpophaga incertulas, Sesamia* spp. (stemborers), *Sesamia inferens* (pink rice stem borer), *Sesamia nonagrioides, Setora nitens, Sitotroga cerealella* (Angoumois grain moth), *Sparganothis pilleriana, Spodoptera* spp. (armyworms), *Spodoptera exigua* (beet armyworm), *Spodoptera fugiperda* (fall armyworm), *Spodoptera oridania* (southern armyworm), *Synanthedon* spp. (root borers), *Thecla basilides, Thermisia gemmatalis, Tineola bisselliella* (webbing clothes moth), *Trichoplusia ni* (cabbage looper), *Tuta absoluta, Yponomeuta* spp., *Zeuzera coffeae* (red branch borer) and *Zeuzera pyrina* (leopard moth).

In yet another embodiment, the insect pests are of the order Orthoptera, such as Anabrus simplex (Mormon cricket), Gryllotalpidae (mole crickets), *Locusta migratoria, Melanoplus* spp. (grasshoppers), *Microcentrum retinerve* (angularwinged katydid), *Pterophylla* spp. (kaydids), *Chistocerca gregaria, Scudderia furcata* (forktailed bush katydid) and *Valanga nigricorni*.

In yet another embodiment, the insect pests are of the order Thysanoptera, such as *Frankliniella fusca* (tobacco *thrips*), *Frankliniella occidentalis* (western flower *thrips*), *Frankliniella shultzei Frankliniella williamsi* (corn *thrips*),

*Heliothrips haemorrhaidalis* (greenhouse *thrips*), *Riphiphorothrips cruentatus, Scirtothrips* spp., *Scirtothrips citri* (citrus *thrips*), *Scirtothrips dorsalis* (yellow tea *thrips*), *Taeniothrips rhopalantennalis* and *Thrips* spp.

In an embodiment Coleopteran insect pests may be selected from but not limited to *Acanthoscelides* spp. (weevils), *Acanthoscelides obtectus* (common bean weevil), *Agrilus planipennis* (emerald ash borer), *Agriotes* spp. (wireworms), *Anoplophora glabripennis* (Asian longhorned beetle), *Anthonomus* spp. (weevils), *Anthonomus grandis* (boll weevil), *Aphidius* spp., *Apion* spp. (weevils), *Apogonia* spp. (grubs), *Ataenius spretulus* (Black Turgrass *Ataenius*), *Atomaria linearis* (pygmy mangold beetle), *Aulacophore* spp., *Bothynoderes punctiventris* (beet root weevil), *Bruchus* spp. (weevils), *Bruchus pisorum* (pea weevil), *Cacoesia* spp., *Callosobruchus maculatus* (southern cow pea weevil), *Carpophilus hemipteras* (dried fruit beetle), *Cassida vittata, Cerosterna* spp, *Cerotoma* spp. (chrysomeids), *Cerotoma trifurcata* (bean leaf beetle), *Ceutorhynchus* spp. (weevils), *Ceutorhynchus assimilis* (cabbage seedpod weevil), *Ceutorhynchus napi* (cabbage *curculio*), *Chaetocnema* spp. (chrysomelids), *Colaspis* spp. (soil beetles), *Conoderus scalaris, Conoderus stigmosus, Conotrachelus nenuphar* (plum *curculio*), *Cotinus nitidis* (Green June beetle), *Crioceris asparagi* (asparagus beetle), *Cryptolestes ferrugineus* (rusty grain beetle), *Cryptolestes pusillus* (flat grain beetle), *Cryptolestes turcicus* (Turkish grain beetle), *Ctenicera* spp. (wireworms), *Curculio* spp. (weevils), *Cyclocephala* spp. (grubs), *Cylindrocpturus adspersus* (sunflower stem weevil), *Deporaus marginatus* (mango leaf-cutting weevil), *Dermestes lardarius* (larder beetle), *Dermestes maculates* (hide beetle), *Diabrotica* spp. (chrysolemids), *Epilachna varivestis* (Mexican bean beetle), *Faustinus cubae, Hylobius pales* (pales weevil), *Hypera* spp. (weevils), *Hypera postica* (alfalfa weevil), *Hyperdoes* spp. (Hyperodes weevil), *Hypothenemus hampei* (coffee berry beetle), *Ips* spp. (engravers), *Lasioderma serricorne* (cigarette beetle), *Leptinotarsa decemlineata* (Colorado potato beetle), *Liogenys futscus, Liogenys suturalis, Lissorhoptrus oryzophilus* (rice water weevil), *Lyctus* spp. (wood beetles/powder post beetles), *Maecolaspis joliveti, Megascelis* spp., *Melanotus communis, Meligethes* spp., *Meligethes aeneus* (blossom beetle), *Melolontha melolontha* (common European cockchafer), *Oberea brevis, Oberea linearis, Oryctes rhinoceros* (date palm beetle), *Oryzaephilus mercator* (merchant grain beetle), *Oryzaephilus surinamensis* (sawtoothed grain beetle), *Otiorhynchus* spp. (weevils), *Oulema melanopus* (cereal leaf beetle), *Oulema oryzae, Pantomorus* spp. (weevils), *Phyllophaga* spp. (May/June beetle), *Phyllophaga* cuyabana, *Phyllotreta* spp. (chrysomelids), *Phynchites* spp., *Popillia japonica* (Japanese beetle), *Prostephanus truncates* (larger grain borer), *Rhizopertha dominica* (lesser grain borer), *Rhizotrogus* spp. (Eurpoean chafer), *Rhynchophorus* spp. (weevils), *Scolytus* spp. (wood beetles), *Shenophorus* spp. (Billbug), *Sitona lineatus* (pea leaf weevil), *Sitophilus* spp. (grain weevils), *Sitophilus granaries* (granary weevil), *Sitophilus oryzae* (rice weevil), *Stegobium paniceum* (drugstore beetle), *Tribolium* spp. (flour beetles), *Tribolium castaneum* (red flour beetle), *Tribolium confusum* (confused flour beetle), *Trogoderma variabile* (warehouse beetle) and *Zabrus tenebioides*.

In an embodiment, the insect pests are of the order Hemiptera, such as *Acrosternum hilare* (green stink bug), *Blissus leucopterus* (chinch bug), *Calocoris norvegicus* (potato mind), *Cimex hemipterus* (tropical bed bug), *Cimex lectularius* (bed bug), *Dagbertus fasciatus, Dichelops furcatus, Dysdercus suturellus* (cotton stainer), Edessa meditabunda, *Eurygaster maura* (cereal bug), *Euschistus heros, Euschistus servus* (brown stink bug), *Helopeltis antonii,* *Helopeltis theivora* (tea blight plantbug), *Lagynotomus* spp. (stink bugs), *Leptocorisa oratorius, Leptocorisa varicornis, Lygus* spp. (plant bugs), *Lygus hesperus* (western tarnished plant bug), *Maconellicoccus hirsutus, Neurocolpus longirostris, Nezara viridula* (southern green stink bug), *Paratrioza cockerelli, Phytocoris* spp. (plant bugs), *Phytocoris californicus, Phytocoris relativus, Piezodorus guildingi, Poecilocapsus lineatus* (fourlined plant bug), *Psallus vaccinicola, Pseudacysta perseae, Scaptocoris castanea* and *Triatoma* spp. (bloodsucking conenose bugs/kissing bugs).

In an embodiment, the insect pests are of the order Homoptera, such as *Acrythosiphon pisum* (pea aphid), *Adelges* spp. (adelgids), *Aleurodes proletella* (cabbage whitefly), *Aleurodicus disperses, Aleurothrixus floccosus* (woolly whitefly), *Aluacaspis* spp., *Amrasca bigutella bigutella, Aphrophora* spp. (leafhoppers), *Aonidiella aurantii* (California red scale), *Aphis* spp. (aphids), *Aphis gossypii* (cotton aphid), *Aphis pomi* (apple aphid), *Aulacorthum solani* (foxglove aphid), *Bemisia* spp. (whiteflies), *Bemisia argentifolii, Bemisia tabaci* (sweet potato whitefly), *Brachycolus noxius* (Russian aphid), *Brachycorynella asparagi* (asparagus aphid), *Brevennia rehi, Brevicoryne brassicae* (cabbage aphid), *Ceroplastes* spp. (scales), *Ceroplastes rubens* (red bawax scale), *Chionaspis* spp. (scales), *Chrysomphalus* spp. (scales), *Coccus* spp. (scales), *Dysaphis plantaginea* (rosy apple aphid), *Empoasca* spp. (leafhoppers), *Eriosoma lanigerum* (woolly apple aphid), *Icerya purchasi* (cottony cushion scale), *Idioscopus nitidulus* (mango leafhopper), *Laodelphax striatellus* (smaller brown planthopper), *Lepidosaphes* spp., *Macrosiphum* spp., *Macrosiphum euphorbiae* (potato aphid), *Macrosiphum granarium* (English grain aphid), *Macrosiphum rosae* (rose aphid), *Macrosteles quadrilineatus* (aster leafhopper), *Mahanarva frimbiolata, Metopolophium dirhodum* (rose grain aphid), *Mictis longicornis, Myzus persicae* (green peach aphid), *Nephotettix* spp. (leafhoppers), *Nephotettix cinctipes* (green leafhopper), *Nilaparvata lugens* (brown planthopper), *Parlatoria pergandii* (chaff scale), *Parlatoria ziziphi* (ebony scale), *Peregrinus maidis* (corn delphacid), *Philaenus* spp. (spittlebugs), *Phylloxera vitifoliae* (grape *phylloxera*), *Physokermes piceae* (spruce bud scale), *Planococcus* spp. (mealybugs), *Pseudococcus* spp. (mealybugs), *Pseudococcus brevipes* (pine apple mealybug), *Quadraspidiotus perniciosus* (San Jose scale), *Rhapalosiphum* spp. (aphids), *Rhapalosiphum maida* (corn leaf aphid), *Rhapalosiphum padi* (oat bird-cherry aphid), *Saissetia* spp. (scales), *Saissetia oleae* (black scale), *Schizaphis graminum* (greenbug), *Sitobion avenae* (English grain aphid), *Sogatella furcifera* (whitebacked planthopper), *Therioaphis* spp. (aphids), *Toumeyella* spp. (scales), *Toxoptera* spp. (aphids), *Trialeurodes* spp. (whiteflies), *Trialeurodes vaporariorum* (greenhouse whitefly), *Trialeurodes abutiloneus* (bandedwing whitefly), *Unaspis* spp. (scales), *Unaspis yanonensis* (arrowhead scale) and *Zulia entreriana*.

In an embodiment, the preferred insect pest controlled is boll weevil.

Thus, in this embodiment, the present invention can provide a method of predominantly controlling adult boll weevil infestation at a locus, said method comprising administering to the locus a combination comprising acetamiprid and bifenthrin.

In an embodiment, the crops selected from but not limited to cereals, such as wheat, oats, barley, spelt, triticale, rye, maize, millet, rice, crops such as sugarcane, soybean, sunflower, rape, canola, tobacco, sugar beet, fodder beet; tuber crops such as potatoes, sweet potatoes etc., crops such as asparagus, hops etc.; fruit plants such as apples, pears, stone-fruits such as for example peaches, nectarines, cherries, plums, apricots, citrus fruits such as oranges, grapefruit, limes, lemons, kumquats, mandarins, satsumas; nuts such as pistachios, almonds, walnuts, pecan nuts, tropical fruits such as mango, *papaya*, pineapple, dates, bananas etc., grapes, vegetables such as endives, lambs, lettuce, fennel, globe and loose-leaf salad, chard, spinach, chicory, cauliflower, broccoli, Chinese cabbage, kale (winter kale or curly kale), kohlrabi, Brussel sprouts, red cabbage, white cabbage and savoy, fruiting vegetables such as aubergines, cucumbers, paprika, marrow, tomatoes, courgettes, sweetcorn, root vegetables such as celeriac, turnip, carrots, swedes, radishes, horse radish, beetroot, salsify, celery, pulses such as peas, beans etc., bulb vegetables such as leeks, onions etc., oil crops such as mustard, poppy, olives, sunflowers, coconut, castor oil plants, cocoa beans, groundnuts; fibre crops such as cotton, jute, flex, hemp, crops such as tea, coffee, rubber, ornamentals including shrubs and flowering plants, vines, rangeland and pastures.

In an embodiment, the method of the present invention may be carried out by applying the combination of acetamiprid and bifenthrin at the locus of the infestation.

Preferably, treating the locus with the combination of the present method comprises administering to the soil, applying to the plant or parts of the plant or seed with an effective amount of acetamiprid and bifenthrin. The administration is preferably by application either when first signs of infestation are seen or when insect pests begin to reappear.

In an embodiment, the present invention can provide a method of predominantly controlling adult insect pests infestation in cotton, the method comprising applying to the locus a combination comprising acetamiprid and bifenthrin.

In an embodiment, the method of the present invention may be used to control adult insect pests in soybean, said method comprising application of acetamiprid and bifenthrin at the locus of the infestation, such that adult insects controlled substantially more than pre-adults.

In an embodiment, the method of the present invention may be used to control adult insect pests in corn, said method comprising application of acetamiprid and bifenthrin at the locus of the infestation, such that adult insects controlled substantially more than pre-adults.

In an embodiment, the method of the present invention may be used to control adult insect pests in paddy, said method comprising application of acetamiprid and bifenthrin at the locus of the infestation, such that adult insects controlled substantially more than pre-adults.

In an embodiment, the present invention may be carried out by application of acetamiprid and bifenthrin in a ratio by weight of between about 1 to 1000 and about 1000 to 1, between about 1 to 500 and about 500 to 1, between about 1 to 300 and about 300 to 1, between about 1 to 100 and about 100 to 1, between about 1 to 50 and 50 to 1 or about 1 to 25 and 25 to 1, between about 1 to 10 and 10 to 1, between about 1 to 5 and 5 to 1, between about 1 to 3 and about 3 to 1, about 1 to 2.5 and 2.5 to 1 or about 1 to 1.

The method of the present invention can be carried out by application of the combination to the soil at a preferred rate of application from about 0.10 to about 10 L/Ha of the combination comprising acetamiprid and bifenthrin, and most preferably from about 0.2 to about 4 L/Ha.

In an embodiment, the method of the present invention may be carried out by applying the combination of acetamiprid and bifenthrin either simultaneously or sequentially. The combination of acetamiprid and bifenthrin can be obtained from separate formulation sources and mixed together and used as a tank-mix, ready-to-apply, spray broth, or slurry, optionally with other pesticides, or acetamiprid and bifenthrin may be obtained as a single formulation mixture such as a pre-mix, concentrate or formulated product and optionally mixed together with other insecticides, attractants, sterilants, bactericides, acaracides, nematicides, fungicides, growth regulators, herbicides, fertilizers and mixtures thereof.

Further, following the finding of the present invention that a combination comprising acetamiprid bifenthrin has enhanced activity specifically against adult insect pests, it is possible to formulate the insecticidal composition such that it is active in controlling adult insect pests, yet is less active (preferably substantially inactive) against pre-adults.

Accordingly, the present invention also provides the use of acetamiprid and bifenthrin for the predominant control of adult insect pests at a locus, wherein the combination of acetamiprid and bifenthrin is applied in an amount such that it is effective in controlling said adults more than pre-adults.

Thus, in an embodiment, the combination of the present invention maybe formulated in a manner which suits the specific application. The formulation may be solid or liquid formulations. Non-limiting examples of suitable liquid formulations may be emulsion concentrates (EC), suspension concentrates (SC), capsule suspensions (CS); suitable solid formulations may be water dispersible granules (WDG) and wettable powders (WP), dusts and the like. In a preferred embodiment, the composition is an emulsion concentrate (EC).

In another preferred embodiment, the composition is a water dispersible granule (WDG) Therefore, in an aspect, the present invention can provide a composition for predominantly controlling adult insect pests infestation at a locus, the composition comprising a combination comprising acetamiprid and bifenthrin.

The composition may contain stabilizers, emetic agents, disintegrating agents, antifoaming agents, wetting agents, dispersing agents, binding agents, dye(s), fillers, carriers, surfactants and optionally solid and/or liquid auxiliaries and/or adjuvants such as wetters, adhesives, dispersants or emulsifiers, carriers that may be solid or liquid.

In an embodiment, the preferred insect pest adults controlled by the composition of the present invention is boll weevil.

Therefore, in this embodiment, the present invention can provide a composition for predominantly controlling adult boll weevil infestation at a locus, the composition comprising a combination comprising acetamiprid and bifenthrin.

In another embodiment, the present invention can provide a composition for predominantly controlling adult boll weevil infestation at a locus, the composition comprising a combination comprising acetamiprid and bifenthrin in a ratio of about 1:1.

In an aspect, the present invention provides a method of improving yield of a plant, said method comprising application of compositions of acetamiprid and bifenthrin at the locus of the plant, such that the said combination controls adult insects more than pre-adults.

Thus in an embodiment, the method of the present invention may be carried out by applying the composition to the locus of the infestation.

In an embodiment, the method of the present invention may be carried out by applying the combination either sequentially or together, either in the form of a tank mix or a pre-formulated composition.

In an alternate embodiment, the combination of acetamiprid and bifenthrin may optionally be mixed with insecticides, attractants, sterilants, bactericides, acaracides, nematicides, fungicides, growth regulators, herbicides, fertilizers and mixtures thereof.

In another aspect, the present invention provides for a method improving yield of a plant, said method comprising application of acetamiprid and bifenthrin at the locus of the plant, such that the said combination controls adult insects more than pre-adults.

Accordingly, in one aspect, the present invention can provides a multi-pack insecticidal product for controlling adult insects at a locus, said product comprising:
(a) a first container comprising acetamiprid;
(b) a second container comprising bifenthrin; and
(c) an instruction manual instructing an user to admix the contents of said first and second containers and administering the admixture to the locus.

The method of the present invention can offer some particular advantages over the prior art. The novel method of the present invention utilises less amount of active ingredients and controls adult insects and thus in turn prevents pre-adults from forming. The novel method of the present invention helps improves yields, and promotes plant health and has no phytotoxicity.

The invention will now be explained in more detail in the following examples that illustrate, but are not intended to limit, the invention.

EXAMPLES

Field trials were conducted to study the effect of the combination of acetamiprid and bifenthrin on the control of adults and pre-adults. The study was carried out in various locations in Brazil on crops—cotton and soybean and the mortality rate of both adults and pre-adults of various insect pests were studied. The study was carried out using randomized block method with 6 treatments and 4 repetitions. Both pre-adults and adults were counted, phytotoxicity and yield was evaluated.

Samples of acetamiprid and bifenthrin technical in a ratio of about 1:1 were tank-mixed and applied as follows:

TABLE 1

| Treatment | Rate of application $ha^{-1}$ | Actives | % Concentration |
|---|---|---|---|
| Formulation A | 120 | Acetamiprid + Bifenthrin | 25.00 + 25.00 |
| Formulation B | 160 | Acetamiprid + Bifenthrin | 25.00 + 25.00 |
| Formulation C | 180 | Acetamiprid + Bifenthrin | 25.00 + 25.00 |
| Formulation D | 200 | Acetamiprid + Bifenthrin | 25.00 + 25.00 |
| Formulation E | 220 | Acetamiprid + Bifenthrin | 25.00 + 25.00 |

Example 1

Field trials were carried out to study the effect of Acetamiprid+Bifenthrin on control of boll weevil (*Anthonomus grandis*) under the incidence of adults on cotton (*Gossypium hirsutum*) and efficacy of each treatment was observed during the evaluations.

Table A demonstrates % efficacy on adults whereas the figures in brackets denote the effect on pre-adults.

TABLE A1

| Treatment | Rate of application $ha^{-1}$ | 3DAA | 5DAA | 7DAA | 10DAA |
|---|---|---|---|---|---|
| | | Adults (Pre-adults) % Efficacy | | | |
| Control | — | — | — | — | — |
| Formulation A | 120 | 80 (51) | 70 (34) | 75 (54) | 91.67 (50) |
| Formulation B | 160 | 80 (57) | 90 (58) | 83.33 (74) | 100 (69.5) |
| Formulation C | 180 | 100 (62) | 90 (66) | 100 (85) | 100 (92) |
| Formulation D | 200 | 100 (75) | 100 (66) | 100 (85) | 100 (92) |
| Formulation E | 220 | 100 (75) | 100 (68) | 100 (85) | 100 (92) |

Data from Table A clearly demonstrates increased mortality of adults as compared to pre-adults, at the same dosage and application rate. The combination of acetamiprid and bifenthrin is clearly more efficacious on adults than on pre-adults. None of the treatments were phytotoxic.

Yield was also calculate for the field trial carried out, the yield improvement was as follows:

TABLE B1

| Treatments | Rate G mL p.c. $ha^{-1}$ | Yield Kg · $ha^1$ | % Increase % |
|---|---|---|---|
| Control | — | 257.50 d | — |
| Formulation A | 120 | 276.25 c | 7.28 |
| Formulation B | 160 | 281.50 b | 9.32 |
| Formulation C | 180 | 285.25 a | 10.78 |
| Formulation D | 200 | 285.75 a | 10.97 |
| Formulation E | 220 | 283.75 a | 10.19 |

As can be seen from the table, yield improvement was as high as 10.19% as compared to control.

Example 2

Another set of field trials were carried out to study the mortality rate of Acetamiprid+Bifenthrin on adults and pre-adults of brown stink bug (*Euschistus heros*) on soybean (*Glycine max*). Table below demonstrates mortality rate in terms of % efficacy on adults whereas the figures in brackets denote the mortality rate in terms of % efficacy on pre-adults.

The rate of application and concentration of acetamiprid and bifenthrin was:

| Treatment | Rate of application $ha^{-1}$ | % Concentration |
|---|---|---|
| Formulation F | 80 | 250 + 250 |
| Formulation G | 100 | 250 + 250 |
| Formulation H | 120 | 250 + 250 |
| Formulation I | 140 | 250 + 250 |

Table A2 demonstrates effects on adults whereas the figures in brackets denote the effect on pre-adults.

TABLE A2

| Treatment | Rate of application ha$^{-1}$ | 3DAA | 5DAA | 7DAA | 10DAA | 15DAA |
|---|---|---|---|---|---|---|
| | | Adults | | | | |
| | | % Efficacy | | | | |
| Control | — | — | — | — | — | — |
| Formulation A | 80 | 75 (69) | 70 (70) | 86.67 (71) | 40 (16) | 41.67 (45) |
| Formulation B | 100 | 75 (61) | 70 (70) | 86.67 (71) | 40 (50) | 75 (18) |
| Formulation C | 120 | 83.33 (84) | 80 (80) | 93.33 (85) | 90 (66) | 83.33 (63) |
| Formulation D | 140 | 83.33 (84) | 80 (80) | 93.33 (85) | 90 (66) | 83.33 (63) |

The data from Table A2 clearly demonstrates increased efficacy on adults as compared to pre-adults, at the same dosage and application rate. The combination of acetamiprid and bifenthrin is clearly more efficacious on adults than on pre-adults. None of the treatments were phytotoxic.

Yield was also calculated for the field trial carried out. The yield improvement was as follows:

| Treatments | Rate G – mL p.c. ha$^{-1}$ | Yield Kg · ha$^1$ | % Increase % |
|---|---|---|---|
| Control | — | 1434.52a | — |
| Formulation A | 80 | 1545.36a | 7.73 |
| Formulation B | 100 | 1538.83a | 7.72 |
| Formulation C | 120 | 1530.90a | 6.72 |
| Formulation D | 140 | 1649.06a | 14.96 |

As can be seen from the table, yield improvement was as high as 14.96% as compared to control.

Example 3

Another set of trials was carried out to evaluate the efficacy and agronomic pesticide practicability of a combination of Acetamiprid+bifenthrin (UPLIO1) to control boll weevil (*Anthonomus grandis*) adults and buttons on cotton (*Gossypium hirsutum* L., cultivar BRS 370 RF), and to evaluate possible symptoms of phytotoxicity of these products into the crop. The crop spacing was maintained at 12 seeds per meter, and the trial protocol was radmonized block with 7 treatments and 4 repetitions. Each tested insecticide formulation was diluted to 200 L/Ha before application. The number of boll weevil adults and buttons was counted per 25 buttons initially. The evaluation interval was 3 days, 5 days, 7 days and 10 days after application for insecticide efficacy and phytotoxicity evaluation. The yield was calculated on the basis of cotton balls harvested in 1.20 meters per plot. The concentration of the active ingredients in the formulation was 375+165 g/L. The efficacy percentage values were rounded off to the nearest digit for ease of comparison. The figures in brackets indicate the effect of these treatments on boll weevil (*Anthonomus grandis*) buttons, while the figures outside the brackets denote the effect of these treatment on boll weevil adults.

| S No. | Parameter | UPLI01 | UPLI01 | UPLI01 | UPLI01 | UPLI01 |
|---|---|---|---|---|---|---|
| 1 | Dosage (g – mL, p.c. per Ha) | 120 | 160 | 180 | 200 | 220 |
| 2 | 3-DAA | 54 (33) | 77 (40) | 87 (41) | 87 (46) | 90 (53) |
| 3 | 5-DAA | 44 (38) | 79 (46) | 88 (46) | 94 (46) | 96 (48) |
| 4 | 7-DAA | 74 (50) | 87 (52) | 93 (54) | 93 (56) | 97 (57) |
| 5 | 3-DAA | 78 (33) | 86 (40) | 92 (41) | 97 (46) | 100 (53) |
| 6 | 5-DAA | 79 (38) | 84 (46) | 91 (46) | 96 (46) | 100 (48) |
| 7 | 7-DAA | 58 (50) | 67 (52) | 94 (54) | 92 (56) | 94 (57) |
| 8 | 3-DAA | 74 (47) | 96 (47) | 96 (55) | 99 (57) | 100 (66) |
| 9 | 5-DAA | 84 (51) | 90 (57) | 91 (62) | 96 (75) | 96 (75) |
| 10 | 7-DAA | 71 (34) | 83 (58) | 91 (66) | 94 (66) | 97 (68) |
| 11 | 10-DAA | 64 (50) | 71 (70) | 89 (92) | 96 (92) | 98 (92) |

Scott-Knott ($p < 0.05$)

This trial was also used to measure the effect of these treatments on the yield, calculated on the basis of cotton balls harvested in 1.20 meters per plot. The yield of cotton (*G. Hirsutum*) was noted in the following table:

| S No. | Test formulation | Dosage (g – mL p.c./Ha) | Productivity (kg/Ha) | Percentage increase over control |
|---|---|---|---|---|
| 1 | Control | — | 3416.67 | — |
| 2 | UPLI01 | 120 | 6734.38 | 97.10 |
| 3 | UPLI01 | 160 | 8164.06 | 138.95 |
| 4 | UPLI01 | 180 | 8371.88 | 145.03 |
| 5 | UPLI01 | 200 | 10562.50 | 209.15 |
| 6 | UPLI01 | 220 | 11812.50 | 245.73 |
| 7 | CV(%) | | 8.25 | — |
| 8 | Median | | 8666.59 | — |

Scott-Knott ($p < 0.05$)

It was thus found that none of the treatments showed phytotoxicity in cotton. The insecticidal combination of acetamiprid and bifenthrin, when combined in a ratio of about 1:1, applied at rates 160 to 220 g/ha reduced significantly the incidence of boll weevil adults (*Anthonomus grandis*) on cotton, providing of reduction between 40 to 92.39% in the number of adults until 10 DAA. Comparatively, the percentage control seen on the number of buttons with damage was not as significant as the control seen on adult boll weevil. It was also possible to observe increases in yield up to 138.95% compared to the control.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A method of predominantly controlling adult insect pest infestation at a locus, the method comprising applying to the locus a composition comprising acetamiprid and bifenthrin, wherein adult infestation control exceeds the control of pre-adults by at least about 5%.

2. The method as claimed in claim 1, wherein the adult infestation control exceeds the control of pre-adults by at least about 50%.

3. The method as claimed in claim 1, wherein the composition comprises acetamiprid and bifenthrin in a ratio of about 1:1 by weight.

4. The method as claimed in claim 1, where the insect pest is selected from *Lepidopteran, Coleopteran, Hemipteran,* and *Homopteran* species.

5. The method as claimed in claim 1, wherein the insect is either a silverleaf whitefly or a boll weevil.

6. A method of predominantly controlling adult boll weevil infestation at a locus, said method comprising administering to the locus a composition comprising acetamiprid and bifenthrin, wherein the adult boll weevil control exceeds the control of pre-adults by at least about 5%.

7. The method as claimed in claim 6, wherein the adult boll weevil control exceeds the control of pre-adults by at least about 50%.

8. The method as claimed in claim 6, wherein the composition comprises acetamiprid and bifenthrin in a ratio of about 1:1 by weight.

* * * * *